United States Patent
Wiley et al.

(10) Patent No.: US 10,598,398 B2
(45) Date of Patent: Mar. 24, 2020

(54) ENERGY RECOVERY VENTILATION SMOKE EVACUATION

(71) Applicant: Air Distribution Technologies IP, LLC, Milwaukee, WI (US)

(72) Inventors: Josiah Wiley, Kansas City, MO (US); Michael G. Longman, Coppell, TX (US)

(73) Assignee: Air Distribution Technologies IP, LLC, Milwaukee, WI (US)

( * ) Notice: Subject to any disclaimer, the term of this patent is extended or adjusted under 35 U.S.C. 154(b) by 1247 days.

(21) Appl. No.: 13/840,624

(22) Filed: Mar. 15, 2013

(65) Prior Publication Data
US 2013/0252537 A1 Sep. 26, 2013

Related U.S. Application Data

(60) Provisional application No. 61/612,997, filed on Mar. 20, 2012.

(51) Int. Cl.
*F24F 11/00* (2018.01)
*F24F 7/08* (2006.01)
(Continued)

(52) U.S. Cl.
CPC ............. *F24F 7/08* (2013.01); *F24F 11/30* (2018.01); *F24F 11/70* (2018.01);
(Continued)

(58) Field of Classification Search
CPC ...... F24F 11/0017; F24F 11/0076; F24F 7/08; F24F 11/70
See application file for complete search history.

(56) References Cited

U.S. PATENT DOCUMENTS 2,454,588 A * 11/1948 Baak ................... F04D 27/0261
417/18
3,934,145 A 1/1976 Dobrzanski et al.
(Continued)

FOREIGN PATENT DOCUMENTS

JP    2004-52613 A  *  2/2004   ......... F02D 13/0261
JP    2006153749 A  *  6/2006
(Continued)

OTHER PUBLICATIONS

Im, KR10-0884890 B1 English machine translation, dated Feb. 23, 2009.*
(Continued)

*Primary Examiner* — Edelmira Bosques
*Assistant Examiner* — Phillip Decker
(74) *Attorney, Agent, or Firm* — Fletcher Yoder, P.C.

(57) ABSTRACT

A control system, comprising one or more smoke sensors, each configured to measure a level of smoke at a location within a building and to output a smoke level signal based at least in part upon the measured level of smoke. A controller configured to receive the smoke level signals and to control an operation of one or more energy recovery ventilation systems in a first mode of operation to recover energy when the smoke level signal is below a predetermined value and in a second mode of operation to evacuate smoke when the smoke level signal is above the predetermined value.

18 Claims, 6 Drawing Sheets

(51) Int. Cl.
*F24F 11/30* (2018.01)
*F24F 11/70* (2018.01)
*F24F 110/50* (2018.01)
*F24F 110/62* (2018.01)

(52) U.S. Cl.
CPC ....... *F24F 2110/50* (2018.01); *F24F 2110/62* (2018.01); *F24F 2203/104* (2013.01); *Y02B 30/78* (2013.01)

(56) References Cited

U.S. PATENT DOCUMENTS

| | | | |
|---|---|---|---|
| 4,037,206 A | | 7/1977 | Dobrzanski et al. |
| 4,308,911 A | | 1/1982 | Mandl |
| 4,478,048 A | | 10/1984 | Dills |
| 4,764,231 A | | 8/1988 | Slawinski et al. |
| 4,765,231 A | * | 8/1988 | Aniello ............... F24F 7/08 454/239 |
| 5,178,581 A | * | 1/1993 | Del Monte ............ F24F 7/08 454/239 |
| 5,257,736 A | | 11/1993 | Roy |
| 5,267,180 A | | 11/1993 | Okayama |
| 5,438,324 A | | 8/1995 | Chyi et al. |
| 5,548,970 A | * | 8/1996 | Cunningham, Jr. ... F24F 3/1423 165/8 |
| 5,609,522 A | | 3/1997 | Szwartz |
| 5,713,724 A | * | 2/1998 | Centers ............... F04B 49/065 417/279 |
| 5,720,658 A | | 2/1998 | Belusa |
| 5,788,571 A | * | 8/1998 | Ivison ................. F24F 7/06 454/249 |
| 5,791,983 A | | 8/1998 | Robertson |
| 6,110,038 A | | 8/2000 | Stern |
| 6,170,480 B1 | * | 1/2001 | Melink ............... F24C 15/2021 126/299 D |
| 6,209,622 B1 | * | 4/2001 | Lagace ................. F24F 3/1423 165/54 |
| 6,328,095 B1 | * | 12/2001 | Felber ................. F24F 3/1423 165/222 |
| 6,414,828 B1 | | 7/2002 | Zimmerman et al. |
| 6,514,138 B2 | * | 2/2003 | Estepp ................. F24F 11/043 454/229 |
| 6,629,886 B1 | * | 10/2003 | Estepp ................. F24F 11/043 454/229 |
| 6,776,708 B1 | * | 8/2004 | Daoutis ................ F24F 7/06 454/229 |
| 6,779,735 B1 | * | 8/2004 | Onstott ............... F24F 12/006 165/248 |
| 6,801,132 B2 | | 10/2004 | Clauss et al. |
| 7,147,168 B1 | | 12/2006 | Bagwell et al. |
| 7,275,533 B2 | * | 10/2007 | Soeholm ............... F23N 3/002 126/299 R |
| 7,571,554 B2 | * | 8/2009 | Sprague ............... F26B 23/002 34/210 |
| 7,623,028 B2 | * | 11/2009 | Kates .................. G01N 33/0065 340/501 |
| 7,632,178 B2 | * | 12/2009 | Meneely, Jr. ........ F24F 11/0017 454/257 |
| 7,802,443 B2 | * | 9/2010 | Wetzel ................. F24F 1/022 165/54 |
| 7,859,395 B2 | * | 12/2010 | Butalla, III .......... F24F 11/0086 340/506 |
| 7,891,573 B2 | * | 2/2011 | Finkam ................ F24F 11/001 700/276 |
| RE44,146 E | | 4/2013 | Bagwell et al. |
| 8,826,165 B2 | | 9/2014 | Harrod et al. |
| 9,092,017 B2 | * | 7/2015 | Rosa .................... G05B 13/00 |
| 9,115,909 B2 | * | 8/2015 | McKie ................. F24F 11/0086 |
| 9,328,936 B2 | | 5/2016 | Meirav et al. |
| 9,404,668 B2 | * | 8/2016 | McKie ................. F28F 27/006 |
| 9,433,809 B2 | * | 9/2016 | Bildstein ............. A62C 2/04 |
| 9,605,861 B2 | | 3/2017 | McKie et al. |
| 9,656,493 B2 | * | 5/2017 | Bildstein ............. A62C 2/04 |
| 2005/0153648 A1 | | 7/2005 | Horner et al. |
| 2005/0236150 A1 | * | 10/2005 | Chagnot ............... F24F 12/006 165/222 |
| 2005/0279845 A1 | | 12/2005 | Bagwell et al. |
| 2007/0205297 A1 | * | 9/2007 | Finkam ................ F24F 11/001 700/276 |
| 2007/0261558 A1 | * | 11/2007 | Ashworth ............. F24F 11/0001 96/397 |
| 2008/0173030 A1 | | 7/2008 | Levan et al. |
| 2009/0215375 A1 | | 8/2009 | Hagensen |
| 2009/0288849 A1 | | 11/2009 | Iimura et al. |
| 2011/0281516 A1 | | 11/2011 | Newcomer |
| 2012/0044064 A1 | | 2/2012 | Maekawa et al. |
| 2012/0048507 A1 | * | 3/2012 | Sheren ................ F24F 12/006 165/59 |
| 2012/0052791 A1 | * | 3/2012 | Kurelowech ........ F24F 11/0017 454/329 |
| 2012/0094590 A1 | | 4/2012 | Lee et al. |
| 2012/0252345 A1 | | 10/2012 | Wolfson |
| 2013/0087302 A1 | * | 4/2013 | McKie ................. F28F 27/006 165/8 |
| 2013/0105104 A1 | * | 5/2013 | Wiley .................. F24F 3/147 165/8 |
| 2013/0116951 A1 | * | 5/2013 | McKie ................. F24F 3/1423 702/61 |
| 2014/0058806 A1 | * | 2/2014 | Guenette ............. F24F 11/006 705/14.1 |
| 2015/0330653 A1 | * | 11/2015 | Rosa .................... F24F 11/006 700/276 |
| 2017/0254556 A1 | * | 9/2017 | Wiley .................. F24F 11/0017 |
| 2017/0299214 A1 | * | 10/2017 | Wiley .................. F24F 11/0017 |

FOREIGN PATENT DOCUMENTS

| | | | |
|---|---|---|---|
| KR | 10-0884890 B1 | * | 2/2009 |
| KR | 10-2011-0017412 A | * | 2/2011 |
| SU | 514611 A | * | 6/1976 ............... B01D 1/00 |

OTHER PUBLICATIONS

Lee, KR10-2011-0017412 A English machine translation, dated Feb. 21, 2011.*
Honeywell XLS1000 Smoke Management Application Manual, Apr. 4, 2003, pp. 1.36-1.41, 1.46, 1.49, 1.50, 2.9-2.11.*
The Examination Search Report issued by Canadian Intellectual Property Office dated Mar. 23, 2016 for corresponding Canadian patent application No. 2,809,856.
Canadian Patent Office; Office Action; Canadian Serial No. 2,809,856; dated Jun. 2, 2015.
The Notice of Allowance issued by Canadian Intellectual Property Office dated Aug. 18, 2016 for corresponding Canadian patent application No. 2,809,856.

* cited by examiner

ENERGY RECOVERY VENTILATION SMOKE EVACUATION

RELATED APPLICATIONS

The present application claims benefit of U.S. Provisional patent application No. 61/612,997, filed Mar. 20, 2012, entitled "ENERGY RECOVERY VENTILATION SMOKE EVACUATION," which is hereby incorporated by reference for all purposes as if set forth herein.

TECHNICAL FIELD

The present disclosure relates generally to air handling systems for buildings, and more particularly to energy recovery ventilation systems, and specifically to methods and systems for smoke evacuation.

BACKGROUND OF THE INVENTION

Building exhaust fans are used to exhaust air from a building, such as when there is smoke or carbon dioxide. However, operation of such building exhaust fans is independent of other heating, ventilating and air conditioning system components, which can create conflicts and misoperation with such components.

SUMMARY OF THE INVENTION

A control system is provided that includes one or more smoke sensors, each configured to measure a level of smoke at a location within a building and to output a smoke level signal based at least in part upon the measured level of smoke, such as a smoke detector for a fire or security system. A controller receives the smoke level signals and controls the operation of one or more energy recovery ventilation systems in a first mode of operation to recover energy when the smoke level signal is below a predetermined value and in a second mode of operation to evacuate smoke when the smoke level signal is above the predetermined value.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
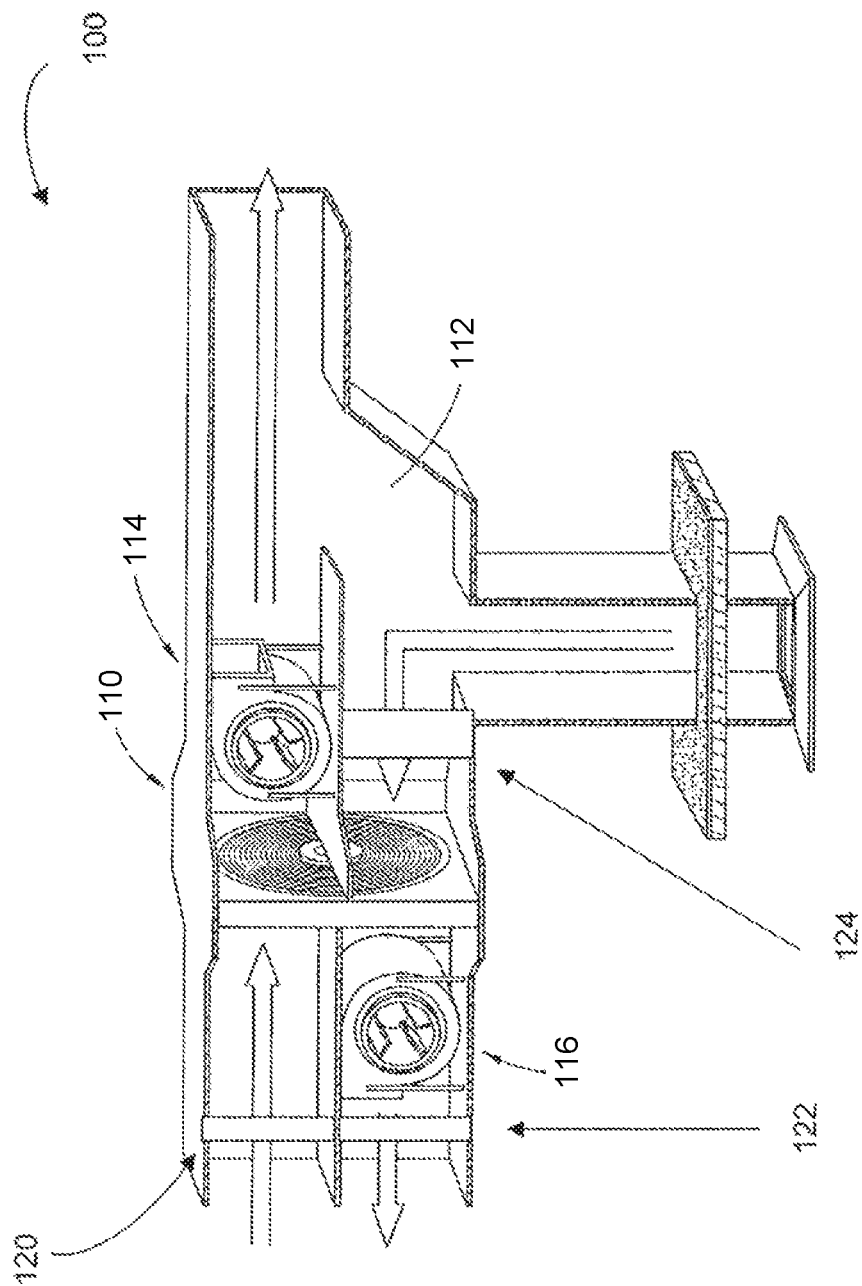
FIG. 1 is a diagram of an ERV system in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

The present disclosure is directed to systems and methods which control energy recovery ventilation (ERV) systems of buildings. ERV systems can be used to recover energy and lower utility expenses. In one exemplary embodiment, energy recovery wheels rotate between the incoming outdoor air and the building exhaust air. As the wheel rotates, it transfers a percentage of the heat and moisture differential from one airstream to the other. In this manner, the outdoor air is pre-conditioned, which reduces the capacity and energy needed from the mechanical heating, ventilating and air conditioning (HVAC) system to process the outdoor air. According to certain guidelines, building environments require a specific amount of fresh air to dilute contaminates in the space and provide ventilation for high concentrations of people. The required amount of fresh air can be useful to provide dilution of contaminates and to minimize the possibility of "sick building syndrome." Furthermore, increasing the amount of outside air that is introduced into a building intake lowers the carbon dioxide levels in the building, and can help keep the occupants alert and healthier. ERVs can also reduce indoor odors with fresh outside air that is brought into the building, and allow stale air to be exhausted out of the building. An exemplary ERV system is described in U.S. Pat. No. 5,548,970, which is hereby incorporated by reference for all purposes as if set forth herein.

Despite these potential advantages of ERVs, problems may arise with operating an ERV when smoke is detected in a building. Depending on the outcome desired, different schemes can be used to achieve the desired result, as described herein. One desired outcome can be to evacuate the smoke from the building as quickly as possible. This outcome can be accomplished by using the air handling unit to move the smoke out of the building. Another way to accomplish this outcome is to evacuate the smoke out of the building through the doors or other building portals, such as by creating positive pressure in the building. Other suitable schemes can also or alternatively be implemented.

FIG. 1 is a diagram of an ERV system 100 in accordance with an exemplary embodiment of the present disclosure. System 100 can be an air-to-air type heat exchanger that includes wheel 110, which can also be referred to as an energy recovery ventilation (ERV) wheel, a thermal wheel or an enthalpy wheel. As wheel 110 rotates between the incoming fresh air ventilation stream and outgoing building air exhaust stream, it can pick up heat energy from the building air and release it into the colder fresh air stream. In different seasons, the inside or the outside air may have more heat and moisture, and thereby more energy.

System 100 can be used where the outside air is warmer than the inside air. As can be seen, the conditioned inside air that is being exhausted can mix with the incoming outside air, via an opening 112 and wheel 110, to lower the temperature, and raise the relative humidity. This process helps to reduce the amount of energy used by the air conditioning and handling system to bring the temperature down to the set point of the system.

It will be appreciated that when the outside air is cooler and the building is to be heated, the exhausted inside air can be used to warm the incoming outside air to reduce power consumption of the ERV.

System 100 can also include one or more fans or blowers, including an outside air intake fan 114, and a building exhaust fan 116 to aid the exchange of air to and from the building (not shown).

System 100 can also include an outside air damper 120 to allow or not allow outside air into the system 100. Similarly, system 100 can include an exhaust damper 122 to allow or not allow air out of the exhaust area of the system 100. System 100 can also include a bypass damper 124. As shown, bypass damper is located generally on the side panel of the exhaust damper. By maintaining positive pressure in the building and opening the bypass damper 124, air can be forced out through the bypass damper 124.

Figure 2:
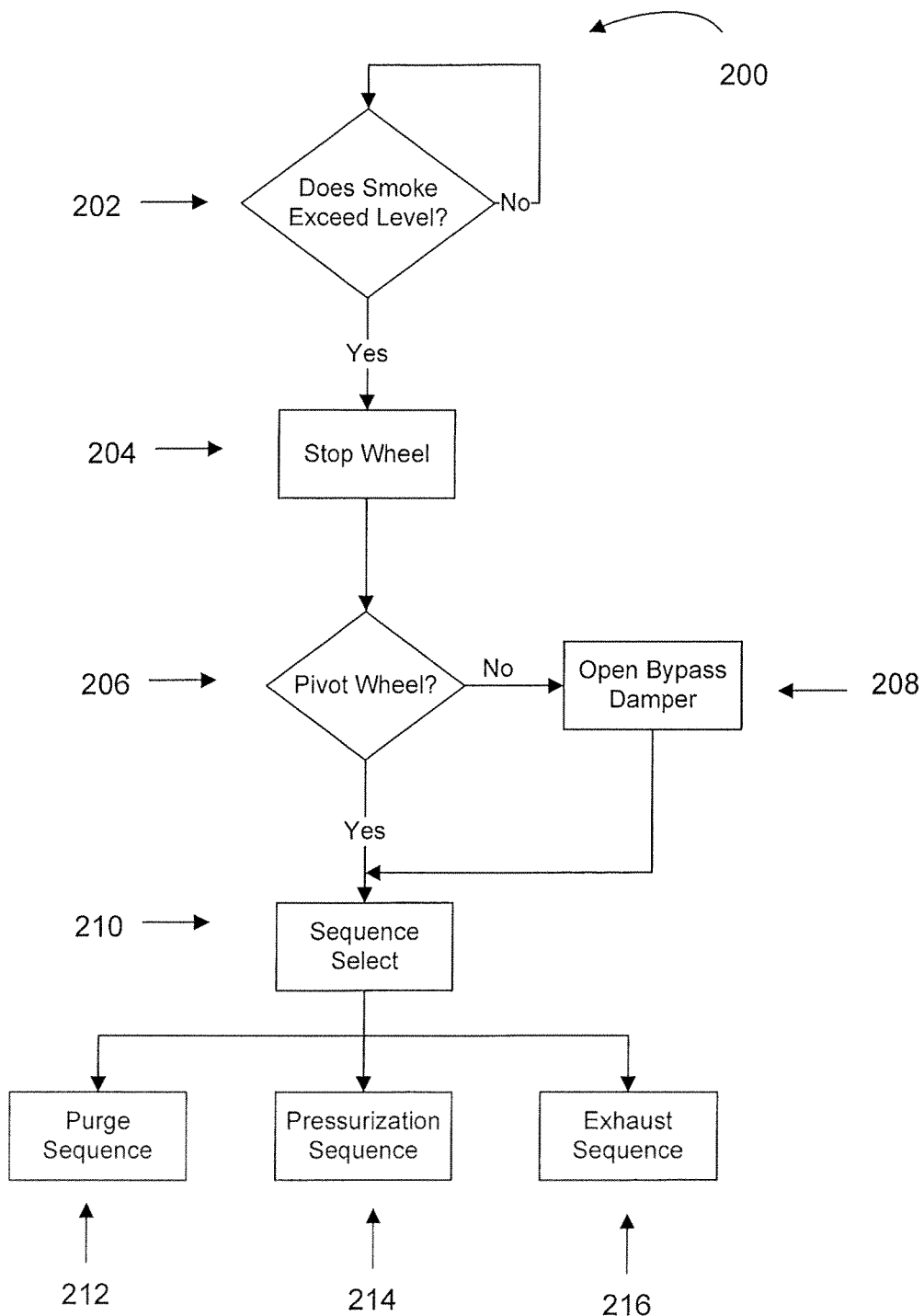
FIG. 2 is a flow chart of an algorithm for operation of an ERV control system in accordance with an exemplary embodiment of the present disclosure.

FIG. 2 is a flow chart of an algorithm 200 for operation of an ERV control system in accordance with an exemplary embodiment of the present disclosure. Algorithm 200 can be implemented in hardware or a suitable combination of hardware and software, and can be one or more software systems operating on a processor.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as keyboards or touch screens, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Algorithm 200 begins at 202, where it is determined whether a current smoke level exceeds a predetermined smoke level. In one exemplary embodiment, the smoke level data can be obtained from an alarm system or other suitable systems that utilize smoke detectors, so as to reduce the cost associated with detecting smoke levels. If it is determined at 202 that the current smoke level does not exceed the predetermined level, the algorithm continues to check the smoke level in the building, and an associated ERV wheel is operated in a first mode of operation to recover energy and lower utility expenses.

If it is determined at 202 that the smoke level does exceed a predetermined level, the algorithm proceeds to 204, where the rotation of the ERV wheel is stopped, such as by activating a brake, by interrupting current to a drive motor or in other suitable manners, so as to operate the ERV wheel in a second mode of operation. The algorithm then proceeds to 206.

At 206, it is determined whether to pivot the ERV wheel out of the airstream, such as based at least in part on the amount of smoke detected, airflow, and/or other physical data. If it is determined at 206 that the wheel should not be pivoted, the algorithm proceeds to 208 where a bypass damper is opened, such as by actuating a valve or other suitable actuator, in order to allow a larger amount of air to be relatively quickly evacuated from the building through the exhaust damper without pivoting of the ERV.

If it is determined at 206 that the ERV wheel should be pivoted out of the airstream, a suitable control signal is generated to an electric motor, pneumatic or hydraulic valve or other suitable devices to cause the ERV wheel to pivot out of the airstream. Once the wheel is pivoted out of the airstream or the bypass damper is opened, the algorithm proceeds to 210 where a sequence is selected. In one exemplary embodiment, the sequence can be selected based on a predetermined jumper setting on a control board, through a user interface, or any other suitable method. The sequence can also or alternatively be selected based on information received from sensors in the system, the type of building, the manner in which the smoke in the building is to be removed from the building or other suitable data.

If a purge sequence is selected at 210, the algorithm proceeds to 212 where a purge sequence is initiated. The purge sequence may include opening air intake dampers, turning an outside air intake fan on and turning a building exhaust fan on to exhaust smoke from the building while replenishing the exhausted air with fresh air.

A pressurization sequence can be started at 214. The pressurization sequence can maintain positive pressure in critical building areas, such as areas where occupants may require breathing or, or where it is desired to keep contaminants out. Positive pressure can be maintained by increasing the air intake fan speed and decreasing or stopping the building exhaust fan speed to keep fresh air going to areas of the building where people are present.

An exhaust sequence can be started at 216. The exhaust sequence can be used to create a negative pressure in the building to both exhaust the smoke and to starve oxygen from any fire or burning. The air intake dampers can be closed and the outside air intake fan can be turned off. The exhaust dampers can be opened and the building exhaust fan can be turned on to exhaust smoke from the building.

After the smoke detection system indicates that the smoke has dissipated to an acceptable level, the selected sequence can continue for a period of time, such as a minute or two, before normal operation of the system is reinstituted. In this manner, inadvertent cycling of the system due to traces of remaining smoke can be avoided.

In normal operation, the system can maintain a default air intake and exhaust volume of air. The air intake and building exhaust fans or blowers can increase the airflow if elevated levels of carbon dioxide or other undesirable gases are detected, such as by interfacing with a carbon dioxide detector of a fire detection system or a smoke detection system. The building pressure is maintained as the speed settings of the fans or blowers are changed to satisfy the carbon dioxide level requirements.

Figure 3:
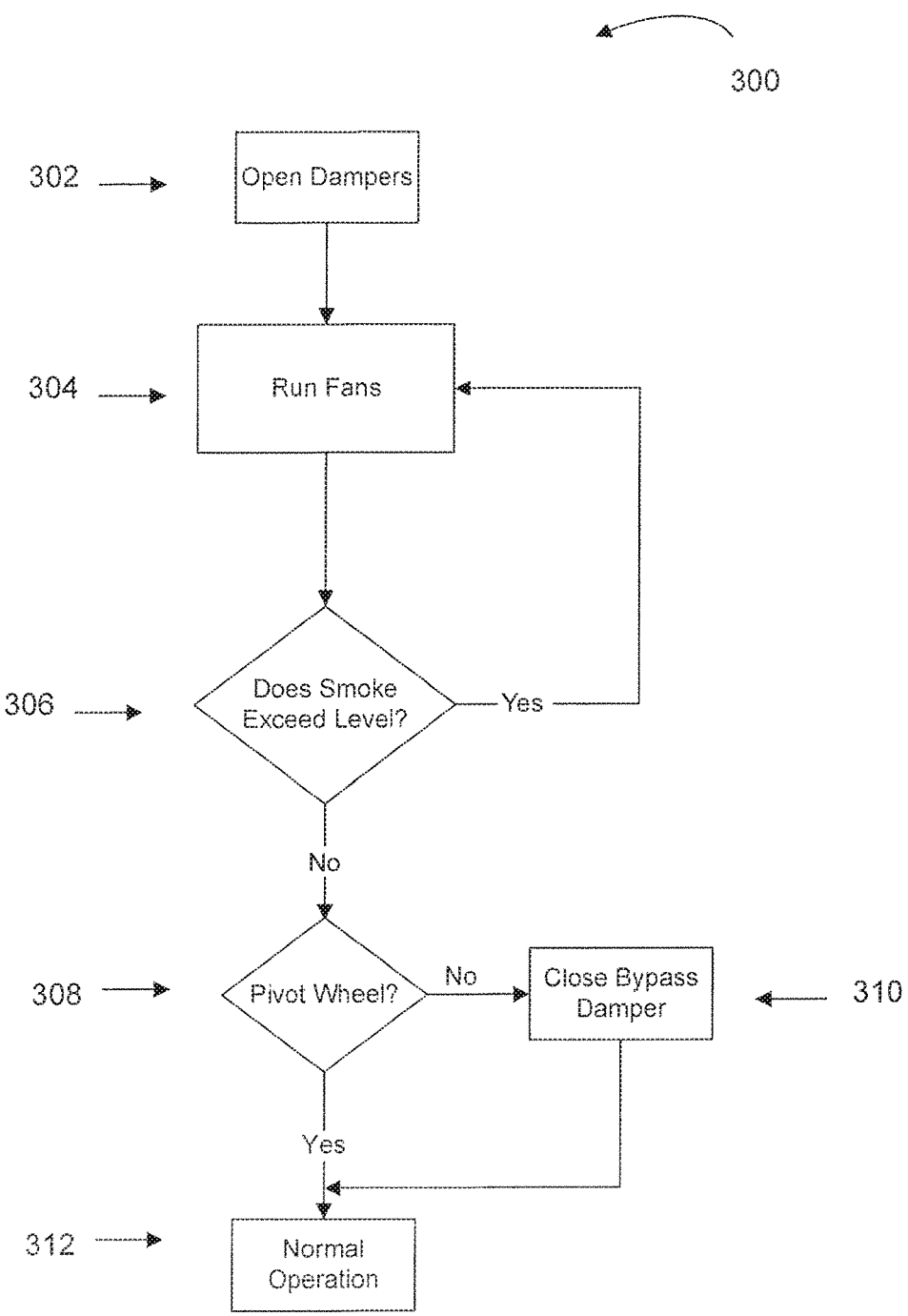
FIG. 3 is a flow chart of an algorithm for purge operation of an ERV control system, in accordance with an exemplary embodiment of the present disclosure.

FIG. 3 is a flow chart of an algorithm 300 for purge operation of an ERV control system, in accordance with an exemplary embodiment of the present disclosure. Algorithm 300 can be implemented in hardware or a suitable combination of hardware and software, and can be one or more software systems operating on a processor.

Algorithm 300 begins at 302 where the outside air intake damper and building exhaust damper are opened, such as by transmitting a suitable control signal to an electronic or pneumatic damper actuator for each damper, in order to purge the smoke out of the building very rapidly through the ERV system. The algorithm then proceeds to 304, where air intake fans and building exhaust fans are actuated, such as by transmitting one or more suitable control signals to one or more fan controllers. In one exemplary embodiment, the air intake and building exhaust fans can be ramped up to a predetermined/preprogrammed speed to provide fresh intake air to replace the exhausted smoke, the activation of the air intake and building exhaust fans can be coordinated to prevent over or under pressures, or other suitable controls can be used. The algorithm then proceeds to 306.

At 306, it is determined whether the smoke level in the building exceeds an acceptable level. In one exemplary embodiment, smoke levels can be determined using one or more sensors that are installed at predetermined locations within the building, the smoke content of building exhaust air can be determined from a smoke sensor, or other suitable processes can also or alternatively be used. If it is determined that the smoke level exceeds an acceptable level, the algorithm returns to 304 where the fans continue to run, the speed of one or more fans is increased to purge more smoke from the building, or other suitable actions are implemented. Otherwise, if it is determined that the smoke level does not exceed an acceptable level, the algorithm proceeds to 308.

At 308, it is determined whether to pivot an ERV wheel into the airstream. In one exemplary embodiment, data from one or more smoke sensors can be used to determine whether a level of smoke does not exceed a predetermined level, whether a number of smoke detectors measuring smoke does not exceed a predetermined number of smoke detectors, or whether other predetermined levels are not exceeded. If it is determined that the wheel should not be pivoted into the airstream at 308, then the algorithm proceeds to 310 where the bypass damper is closed, such as by generating a control signal to actuate an electric or hydraulic damper actuator or in other suitable manners. The algorithm then proceeds to 312, where normal operation is continued. Likewise, the algorithm proceeds to 312 from 308 if it is determined that the wheel should be pivoted and after the wheel has been pivoted, such as by actuating a pivot valve or motor or in other suitable manners.

In operation, algorithm 300 allows a controller or other suitable device to control one or more damper actuators, fan controllers or wheel pivot actuators in response to data from smoke detectors, smoke level monitors, smoke sample devices or other suitable data regarding the content or presence of smoke in building air. Algorithm 300 thus allows smoke to be quickly evacuated from a building, based on the location and volume of smoke that is being generated.

Figure 4:
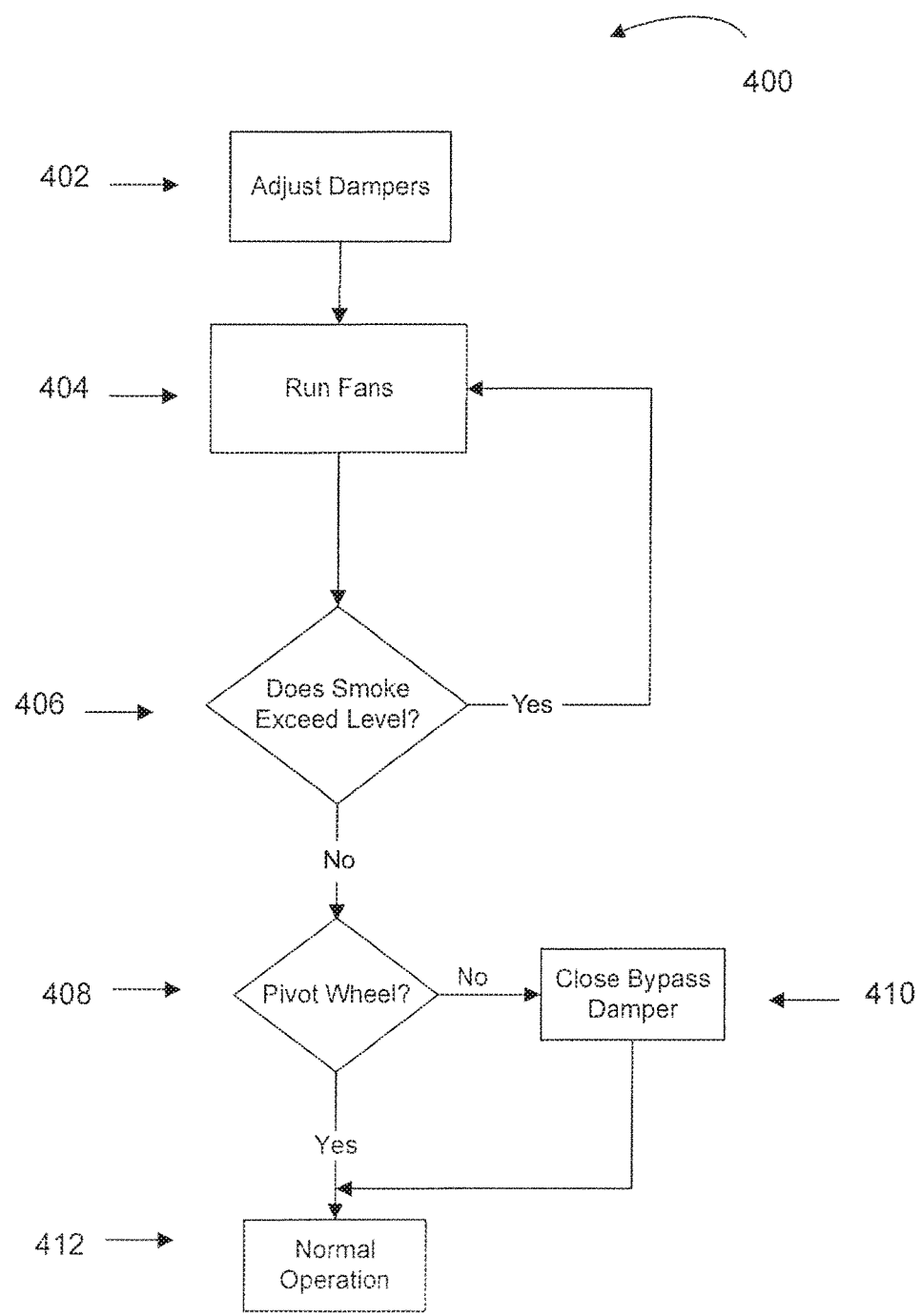
FIG. 4 is a flow chart of an algorithm for pressure sequence operation of an ERV control system, in accordance with an exemplary embodiment of the present disclosure.

FIG. 4 is a flow chart of an algorithm 400 for pressure sequence operation of an ERV control system, in accordance with an exemplary embodiment of the present disclosure. Algorithm 400 can be implemented in hardware or a suitable combination of hardware and software, and can be one or more software systems operating on a processor.

Algorithm 400 begins at 402, where outside air intake and building exhaust dampers are adjusted. In one exemplary embodiment, data from one or more pressure sensors can be received and processed to determine outside air intake and building exhaust damper configurations and whether a positive pressure exists within a building. If it is determined that a positive pressure does not exist and that the outside air intake and building exhaust damper configurations are open, then control signals can be generated to close the building exhaust dampers, such as by incrementally closing one or more actuators until a positive pressure is achieved, by closing one or more dampers completely, or in other suitable manners. The algorithm then proceeds to 404.

At 404, air intake and building exhaust fans are operated at predetermined and/or preprogrammed speeds to achieve the proper pressurization. In one exemplary embodiment, the operating speed of one or more air intake and building exhaust fans can be increased or decreased to maintain a predetermined positive pressure setting in one or more building areas. In this exemplary embodiment, the air intake fan speed can be increased and the building exhaust fan speed can be decreased in order to increase a pressure in one or more rooms that are contained within a zone that is controlled by the air intake and building exhaust fans, or other suitable processes can also or alternatively be used. The algorithm then proceeds to 406.

At 406, data from one or more smoke detectors, smoke level monitors, air sampling devices or other suitable devices is used to determine a smoke level in the building, and it is determined whether the smoke level exceeds a predetermined acceptable level or levels, such as a number of smoke detectors at which smoke is detected, a level of smoke particulates in one or more locations or at one or more building exhaust dampers, or other suitable levels. If it is determined that the smoke level exceeds an acceptable level or levels, the algorithm returns to 404 and the fans continue to run, and/or the speed can be increased to achieve the proper pressurization in the critical building areas. If it is determined that the smoke level does not exceed the acceptable level or levels, the algorithm proceeds to 408, where it is determined whether to pivot the ERV wheel into the airstream. In one exemplary embodiment, a decision to pivot the ERV wheel can be based on whether the dampers and fans are at a maximum possible setting to achieve smoke reduction, whether smoke levels have fallen below a predetermined level, whether smoke levels are decreasing at a rate that exceeds a predetermined rate, or other suitable data. If it is determined at 408 not to pivot the ERV wheel into the airstream, the algorithm proceeds to 410, where a bypass damper is closed, such as by generating a bypass damper actuator control signal. The algorithm then proceeds to 412, where normal operation continues. Likewise, if the ERV wheel is pivoted at 408, the algorithm proceeds to 412, where normal operation continues.

In operation, algorithm 400 allows a controller or other suitable device to control one or more damper actuators, fan controllers or wheel pivot actuators in response to data from smoke detectors, smoke level monitors, smoke sample devices, pressure sensors or other suitable data regarding the content or presence of smoke in building air and air pressure within one or more rooms or zones of the building. Algorithm 400 thus allows smoke to be evacuated based on the location and volume of smoke that is being generated, while maintaining predetermined pressurization levels within the building.

Figure 5:
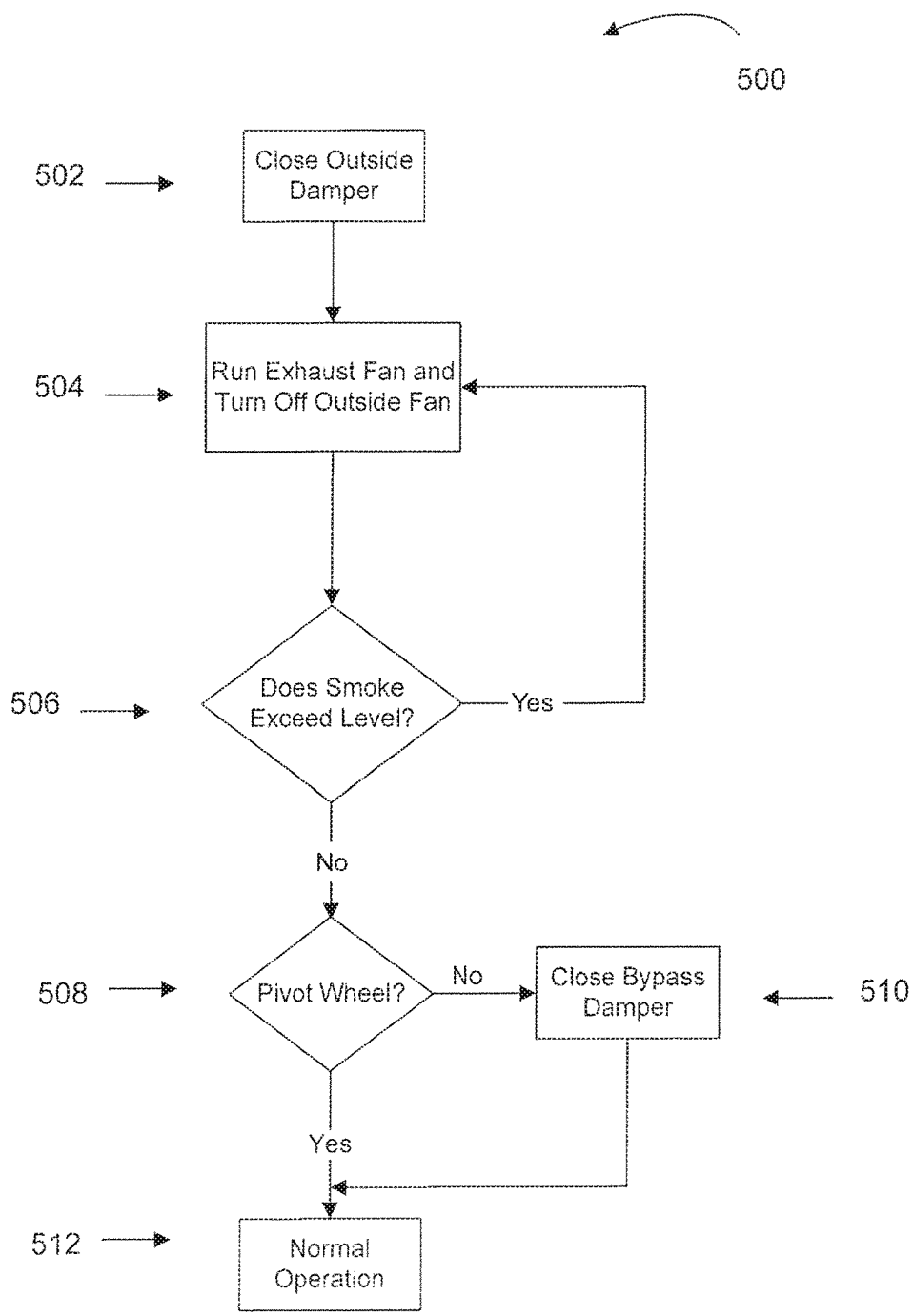
FIG. 5 is a flow chart of an algorithm for exhaust sequence operation of an ERV control system, in accordance with an exemplary embodiment of the present disclosure.

FIG. 5 is a flow chart of an algorithm 500 for exhaust sequence operation of an ERV control system, in accordance with an exemplary embodiment of the present disclosure. Algorithm 500 can be implemented in hardware or a suitable combination of hardware and software, and can be one or more software systems operating on a processor.

Algorithm 500 begins at 502, where the outside air intake dampers are actuated. In one exemplary embodiment, one or more pressure readings can be obtained and one or more outside air intake dampers can be opened or closed in order to maintain negative pressure in one or more zones of the building relative to other building zones, the outside or in other manners. The algorithm then proceeds to 504.

At 504, a speed setting for one or more building exhaust fans and outside air intake fans are increased or lowered to achieve a predetermined negative pressure level in the one or more zones of the building. In one exemplary embodiment, the building exhaust fan speed can be increased, the air intake fan speeds can be lowered or stopped, or other suitable processes can be used to generate or maintain a negative pressure in one or more building zones. The algorithm then proceeds to 506.

At 506, data from one or more smoke detectors, smoke level detectors, air monitors or other suitable devices is processed to determine whether there is an unacceptable level of smoke in the building. If the smoke does not exceed an acceptable level, such a number of rooms in which smoke is detected, a level of detected smoke particulates or other suitable levels, the algorithm returns to 504 and the fans continue to operate, the building exhaust fan speed can be increased, the air intake fan speed can be decreased, or other suitable fan setting changes are implemented in order to achieve the proper pressurization in the predetermined building zones. If it is determined at 506 that the smoke exceeds an acceptable level, then the algorithm proceeds to 508.

At 508, it is determined whether to pivot the ERV wheel into the airstream. In one exemplary embodiment, a decision to pivot the ERV wheel can be based on whether the dampers and fans are at a maximum possible setting to achieve smoke reduction, whether smoke levels have fallen below a predetermined level, whether smoke levels are decreasing at a rate that exceeds a predetermined rate, or other suitable data. If it is determined at 508 not to pivot the ERV wheel into the airstream, the algorithm proceeds to 510, where a bypass damper is closed, such as by generating a bypass damper actuator control signal. The algorithm then proceeds to 512, where normal operation continues. Likewise, if the ERV wheel is pivoted at 508, the algorithm proceeds to 512, where normal operation continues.

In operation, algorithm 500 allows a controller or other suitable device to control one or more damper actuators, fan controllers or wheel pivot actuators in response to data from smoke detectors, smoke level monitors, smoke sample devices or other suitable data regarding the content or presence of smoke in building air. Algorithm 500 thus allows smoke to be evacuated from a building based on the location and volume of smoke that is being generated, while maintaining predetermined pressurization levels within the building.

Figure 6:
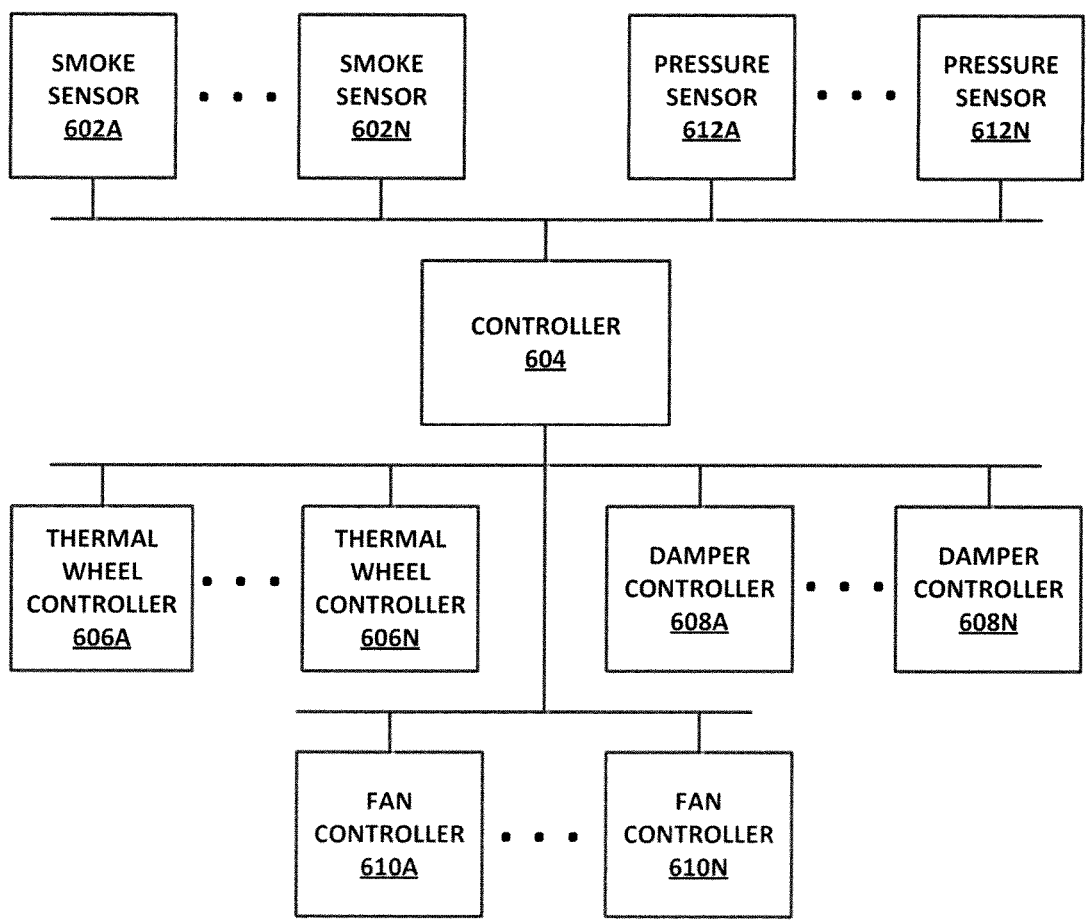
FIG. 6 is a diagram of a system for controlling an ERV system in accordance with an exemplary embodiment of the present disclosure.

FIG. 6 is a diagram of a system 600 for controlling an ERV system in accordance with an exemplary embodiment of the present disclosure. System 600 includes smoke sensors 602A through 602N, controller 604, thermal wheel controllers 606A through 606N, damper controllers 608A through 608N, fan controllers 610A through 610N and pressure sensors 612A through 612N.

Smoke sensors 602A through 602N can sense the presence of smoke in ambient air, can sense the level of smoke in ambient air and can output a signal generally corresponding to the level of smoke sensed, can capture a predetermined volume of ambient air and generate a metric that represents a relative or absolute number of smoke particulates per unit volume that have been detected, or can generate other suitable smoke detection data. In one exemplary embodiment, smoke sensors 602A through 602N can be associated with an existing smoke detection system, fire detection system, security system or other suitable systems, so as to facilitate the implementation and reduce the cost of system 600 by utilizing one or more existing ERV wheels, one or more existing dampers, one or more existing fans or one or more existing pressure sensors. Smoke sensors 602A through 602N can be coupled to controller 604 using one or more wireless communications media, wire line communications media, fiber optic communications media or other suitable communications media or combinations of communications media.

Pressure sensors 612A through 612N can sense a local air pressure and can output a signal generally corresponding to the local air pressure. Pressure sensors 612A through 612N can be coupled to controller 604 using one or more wireless communications media, wire line communications media, fiber optic communications media or other suitable communications media or combinations of communications media.

Thermal wheel controllers 606A through 606N can generate data that defines a position and speed of one or more thermal wheels and can receive control data and generate actuation or power data to control an operation of one or more electrical motors or actuators, hydraulic or pneumatic actuators or other suitable devices that can be used to control a speed and position of one or more thermal or ERV wheels. Thermal wheel controllers 606A through 606N can be coupled to controller 604 using one or more wireless communications media, wire line communications media, fiber optic communications media or other suitable communications media or combinations of communications media.

Damper controllers 608A through 608N can generate data that defines a position of one or more dampers and can receive control data and generate actuation or power data to control an operation of one or more electrical motors or actuators, hydraulic or pneumatic actuators or other suitable devices that can be used to control the position of one or more dampers. Damper controllers 608A through 608N can be coupled to controller 604 using one or more wireless communications media, wire line communications media, fiber optic communications media or other suitable communications media or combinations of communications media.

Fan controllers 610A through 610N can generate data that defines a speed of one or more fans and can receive control data and generate actuation or power data to control an operation of one or more electrical motors or other suitable devices that can be used to control the speed of one or more fans. Fan controllers 610A through 610N can be coupled to controller 604 using one or more wireless communications media, wire line communications media, fiber optic communications media or other suitable communications media or combinations of communications media.

Controller 604 can be implemented in hardware or a suitable combination of hardware and software, and can be one or more software systems operating on a processor. Controller 604 is coupled to smoke sensors 602A through 602N, thermal wheel controllers 606A through 606N, damper controllers 608A through 608N, fan controllers 610A through 610N and pressure sensors 612A through 612N using one or more wireless communications media, wire line communications media, fiber optic communications media or other suitable communications media or combinations of communications media. In one exemplary embodiment, controller 604 can receive data from smoke sensors that indicates the presence or quantity of smoke in the air near each smoke sensor, a rate of change of smoke content or air pressure, thermal wheel position data, damper position data, fan speed data and pressure data and can convert the signals into information which can be used by controller 604 to control thermal wheel position controllers, fan speed and damper position controllers. In this exemplary embodiment, controller 604 can implement one or more steps of algorithms 300, 400 and 500, or can implement other suitable algorithms or functions.

Controller 604 can also control the operation and position of thermal wheels associated with thermal wheel controllers 606A through 606N, the position of dampers associated with damper controllers 608A through 608N, and the position and operation of fans associated with fan controllers 610A through 610N, based at least in part on the data from smoke sensors 602A through 602N and pressure sensors 612A through 612N. In another exemplary embodiment, controller 604 can receive set point data for fans, dampers and ERV wheels as a function of smoke level data, pressure data and other suitable data, where the set point data is used to determine the operation and control the positions of fans, dampers and ERV wheels. Controller 604 can also receive programming that defines the sequence of operation of the system when smoke is detected, such as to maintain a positive or negative pressure, to expedite evacuation of smoke or for other suitable purposes.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The exemplary embodiments disclosed herein may suitably be practiced in the presence or absence of any element that is not specifically disclosed herein.

What is claimed is:

1. A method of controlling operation of an energy recovery ventilation system that provides heating, ventilating, and air conditioning to at least one room of a building, comprising:
   determining a smoke level with a smoke sensor;
   receiving a smoke signal at a processor from the smoke sensor, wherein the smoke signal is based on the smoke level; and
   in response to receiving the smoke signal:
      selecting a predetermined sequence from a plurality of predetermined sequences via the processor in response to determining that the smoke level exceeds a threshold level, wherein the plurality of predetermined sequences comprises:
         a purge sequence, wherein the purge sequence is performed by increasing an exhaust fan speed to exhaust stale air from the at least one room and increasing an intake fan speed to replenish the stale air with fresh air directed into the at least one room;
         a pressurization sequence, wherein the pressurization sequence is performed by increasing the intake fan speed and decreasing the exhaust fan speed to achieve a positive pressure within the at least one room by directing the fresh air into the at least one room; and
         an exhaust sequence, wherein the exhaust sequence is performed by decreasing the intake fan speed and increasing the exhaust fan speed to achieve a negative pressure within the at least one room by exhausting the stale air from the at least one room; and
      controlling the operation of the energy recovery ventilation system via the processor to perform the predetermined sequence.

2. The method of claim 1, wherein the processor is configured to control operation of one or more fans, one or more dampers, one or more thermal wheels, or any combination thereof.

3. The method of claim 1, wherein the purge sequence is performed by:
   opening an outside air damper and opening an exhaust air damper, and
   running the intake fan and the exhaust fan at predetermined or preprogrammed speeds.

4. The method of claim 1, wherein the pressurization sequence is performed by:
   closing an exhaust air damper, and
   running the intake fan and the exhaust fan at predetermined or preprogrammed speeds to achieve the positive pressure within the at least one room.

5. The method of claim 1, wherein the exhaust sequence is performed by:
   closing an outside air damper, and
   running the intake fan and the exhaust fan at predetermined or preprogrammed speeds to achieve the negative pressure within the at least one room.

6. The method of claim 1, wherein the processor is configured to pivot one or more thermal wheels of the energy recovery ventilation system from a first position to a second position when the smoke level exceeds the threshold level, wherein the one or more thermal wheels are disposed in an airstream of the energy recovery ventilation system in the first position, and wherein the one or more thermal wheels are disposed out of the airstream in the second position.

7. The method of claim 1, wherein the processor is configured to open a bypass damper when the smoke level exceeds the threshold level.

8. The method of claim 1, wherein controlling the operation of the energy recovery ventilation system via the processor to perform the predetermined sequence further comprises:
   monitoring the smoke level with the smoke sensor; and
   in response to determining that the smoke level falls below the threshold level:
      controlling the operation of the energy recovery ventilation system via the processor to continue performing the predetermined sequence for a designated time interval; and terminating performance of the predetermined sequence and controlling the operation of the energy recovery ventilation system via the processor to resume a normal operation mode upon a determination that the designated time interval has lapsed.

9. A method of controlling operation of an energy recovery ventilation system that provides heating, ventilating, and air conditioning to one or more rooms of a building, comprising:
determining an air pressure level with at least one sensor;
receiving a data signal at a processor from the at least one sensor, wherein the data signal is based on the air pressure level; and
in response to receiving the data signal:
selecting a predetermined sequence from a plurality of predetermined sequences via the processor based on a rate of change of the air pressure level, wherein the plurality of predetermined sequences comprises:
a purge sequence, wherein the purge sequence is performed by increasing an intake fan speed and increasing an exhaust fan speed;
a pressurization sequence, wherein the pressurization sequence is performed by increasing the intake fan speed and decreasing the exhaust fan speed; and
an exhaust sequence, wherein the exhaust sequence is performed by decreasing the intake fan speed and increasing the exhaust fan speed; and
controlling the operation of the energy recovery ventilation system via the processor to perform the predetermined sequence.

10. The method of claim 9, wherein the processor is configured to control operation of one or more fans, one or more dampers, one or more thermal wheels, or any combination thereof.

11. The method of claim 9, wherein the purge sequence is performed by:
opening an outside air damper and opening an exhaust air damper, and
running the intake fan and the exhaust fan at a predetermined or preprogrammed speed.

12. The method of claim 9, wherein the pressurization sequence is performed by:
closing an exhaust damper, and
running the intake fan and the exhaust fan at a predetermined or preprogrammed speed to achieve a predetermined pressurization.

13. The method of claim 9, wherein the exhaust sequence is performed by:
closing an outside air damper,
running the exhaust fan at a predetermined or preprogrammed speed; and
stopping the intake fan to achieve a negative pressurization.

14. A method of controlling operation of an energy recovery ventilation system that provides heating, ventilating, and air conditioning to one or more rooms of a building, comprising:
determining a first smoke level with a first sensor;
determining a second smoke level with a second sensor;
receiving a first data signal at a processor from the first sensor, wherein the first data signal is based on the first smoke level;
receiving a second data signal at the processor from the second sensor, wherein the second data signal is based on the second smoke level; and
after receiving the first data signal and the second data signal:
selecting a predetermined sequence from a plurality of predetermined sequences via the processor in response to determining that the first smoke level and the second smoke level exceed a threshold smoke level, wherein the plurality of predetermined sequences comprises:
a purge sequence, wherein the purge sequence is performed by increasing an exhaust fan speed to exhaust stale air from at least one room of the one or more rooms and increasing an intake fan speed to replenish the stale air with fresh air directed into the at least one room of the one or more rooms;
a pressurization sequence, wherein the pressurization sequence is performed by increasing the intake fan speed and decreasing the exhaust fan speed to achieve a positive pressure within the at least one room of the one or more rooms by directing the fresh air into the at least one room of the one or more rooms; and
an exhaust sequence, wherein the exhaust sequence is performed by decreasing the intake fan speed and increasing the exhaust fan speed to achieve a negative pressure within the at least one room of the one or more rooms by exhausting the stale air from the at least one room of the one or more rooms; and
controlling the operation of the energy recovery ventilation system via the processor to perform the predetermined sequence.

15. The method of claim 14, comprising:
determining a first air pressure level with the first sensor; and
determining a second air pressure level with the second sensor, wherein the energy recovery ventilation system is configured to perform the predetermined sequence based on a rate of change of the first air pressure level and a rate of change of the second air pressure level.

16. The method of claim 14, wherein the processor is configured to control operation of one or more fans, one or more dampers, one or more thermal wheels, or any combination thereof, based on the first smoke level and the second smoke level.

17. The method of claim 16, wherein the processor is configured to control the operation of the one or more fans, the one or more dampers, the one or more thermal wheels, or any combination thereof, to maintain a the positive pressure or the negative pressure within the at least one room of the one or more rooms.

18. The method of claim 14, wherein the processor is configured to pivot one or more thermal wheels out of an air stream of the energy recovery ventilation system when the first smoke level and the second smoke level exceed the threshold smoke level.

* * * * *